United States Patent [19]

Ulug

[11] Patent Number: 4,649,535
[45] Date of Patent: Mar. 10, 1987

[54] METHOD AND APPARATUS FOR MAINTAINING A DYNAMIC LOGICAL RING IN A TOKEN PASSING LAN

[75] Inventor: Mehmet E. Ulug, Schenectady, N.Y.

[73] Assignee: General Electric Company, Schenectady, N.Y.

[21] Appl. No.: 733,015

[22] Filed: May 13, 1985

[51] Int. Cl.⁴ .............................................. H04J 3/16
[52] U.S. Cl. ......................................... 370/86; 370/89
[58] Field of Search ............................. 370/85, 86, 89; 340/825.05

[56] References Cited

U.S. PATENT DOCUMENTS

| | | | |
|---|---|---|---|
| 4,058,681 | 11/1977 | Imaizumi | 179/15 |
| 4,491,946 | 1/1985 | Kryskow, Jr. et al. | 370/89 |
| 4,494,233 | 1/1985 | Bahr et al. | 370/86 |
| 4,506,360 | 3/1985 | Kryskow, Jr. et al. | 370/85 |
| 4,507,777 | 3/1985 | Tucker et al. | 370/16 |
| 4,511,958 | 4/1985 | Funk | 370/85 |

Primary Examiner—Douglas W. Olms
Assistant Examiner—Kenneth I. Rokoff
Attorney, Agent, or Firm—Richard V. Burgujian; James C. Davis, Jr.; Paul R. Webb, II

[57] ABSTRACT

Method and apparatus is disclosed for maintaining a dynamic logical ring in a token passing local area network such that each bus interface unit coupled to the network can freely and unilaterally initiate participation therein by monitoring the transmission bus until it is not busy and, thereafter, transmitting a solicit successor packet to initiate entrance to the ring. Further, method is disclosed for re-establishing the ring after a bus interface unit fails or a token is destroyed. Lastly, method and apparatus is disclosed for establishing the logical ring after initialization.

23 Claims, 5 Drawing Figures

METHOD AND APPARATUS FOR MAINTAINING A DYNAMIC LOGICAL RING IN A TOKEN PASSING LAN

BACKGROUND OF THE INVENTION

The present invention relates in general to local area networks and, more particularly, to method and apparatus for maintaining a dynamic logical ring in a token passing local area network.

Local area networks (LANs) are becoming more and more prevalent in today's world. With this widespread acceptance comes the need to improve both the speed and efficiency of these systems. The present invention provides method and apparatus for improving the speed and efficiency of a token passing LAN by maintaining a dynamic logical ring.

In a token passing local area network, a plurality of bus interface units (BIUs) are coupled to a commmon transmission line for transmitting information packets therebetween. Each BIU, or node, is permitted to transmit only while in control of the bus. The token is passed from BIU to BIU in accordance with the order of the logical ring.

Logical ring, as used herein, refers to a list which prescribes the order in which the token is passed from BIU to BIU. In prior art LANs, the logical ring need prescribe no particular order to pass the token, the only limitation being that each BIU listed in the logical ring must be able to receive the token and, thereafter, transmit the token.

In token passing local area networks, it is desirable to maintain a dynamic logical ring, i.e., a logical ring which only passes the token to active BIUs, thereby reducing the token rotation time. However, prior art protocols, such as that described in IEEE Project 802 Local Network Standards, Draft C, Section 4 (1982), for adding or deleting BIUs to the logical ring incur delays caused by the departing, entering and soliciting BIUs which make the mean bus access delay unacceptable for real time operations.

Particularly, prior art protocols require that the entering BIU be solicited by a participating BIU. Thus, a BIU wishing to enter the ring cannot unilaterally initiate participation in the local area network. Further, a BIU wishing to enter the network can only be solicited by a particular one of the BIUs already participating therein. Hence, additional delay is incurred until that particular BIU solicits prospective entrants to the ring.

Similarly, when a BIU fails, and therefore cannot transmit the token to its successor, the logical ring must be re-established. Prior art protocols for reestablishing the logical ring incur unacceptable delays in determining the new successor to the failed BIU's predecessor. This is especially so when two or more successive BIUs fail simultaneously.

Lastly, when LANs are used in manufacturing or noisy environments, tokens may be lost, i.e., not received or, received yet altered so as to be unrecognizable. In this case the LAN must be able to determine that a token has been lost and generate a new token. Again prior art protocols incur unacceptable delays in generating new tokens.

SUMMARY OF THE INVENTION

The subject invention provides method and apparatus for maintaining a dynamic logical ring in a token passing local area network (LAN) wherein the bus interface units (BIUs) of the network are allowed to freely and unilaterally initiate entrance to the logical ring. Further, the present invention provides method and apparatus for initializing the logical ring at power up and for reestablishing the logical ring upon the occurrence of a failed BIU. Lastly, the present invention provides method and apparatus for detecting the loss of a token and regenerating new tokens.

In accordance with the method of the present invention, a BIU wishing to enter the logical ring monitors the transmission bus until it is not busy and, thereafter, transmits its information packet followed by a solicit successor (SS) packet. After receiving the SS packet, the participating BIUs cooperate to identify the successor to the entering BIU. This is done by first determining whether any participating BIUs are coupled to the bus in the direction of the left end with respect to the entering BIU. If a participating BIU is coupled to the bus to the left of the entering BIU, the successor to the entering BIU is identified by determining which participating BIU is coupled to the bus physically proximate the entering BIU in the direction of the left end. Alternatively, if no participating BIUs are coupled to the bus in the direction of the left end with respect to the entering BIU, the participating BIUs cooperate to identify the successor to the entering BIU by determining which participating BIU is coupled to the bus physically proximate the right end. In each case, the participating BIU identified as the successor to the entering BIU communicates with its former predecessor and the entering BIU to re-establish the logical ring such that the token is passed from the former predecessor to the entering BIU to the identified successor.

To determine that a BIU has failed and, thereafter, re-establish the ring, each BIU which transmits a token to its successor monitors the bus for an indication that its successor has received the token. If the successor does not receive the token after a first transmission thereof, the token is retransmitted a second time. If the token is not received after the second transmission, the BIU assumes its successor has failed and transmits an SS packet to determine its new successor and thereby re-establish the ring in the same manner as described above with respect to the entering BIU.

To determine that a token has been destroyed and thereafter regenerate the token, each BIU which transmits the token initiates a token rotation timer for timing the return of the token. If the token is not received after the token rotation time interval has expired, the BIU assumes the token has been lost and transmits its information packet followed by a new token. A method is provided for eliminating a token should more than one be detected on the bus.

Finally, to establish the logical ring during initialization after power is provided to the network, the BIUs wishing to participate in the local area network cooperate to ascertain or determine their physical order along the bus such that the token will be passed from the participating BIU coupled proximate the right end of the bus between physically adjacent participating BIUs to the participating BIU coupled proximate the left end and then passed back to the participating BIU coupled proximate the right end.

Apparatus is also provided for operating the BIUs of a token passing local area network in accordance with the method as described hereinabove for maintaining a dynamic logical ring.

It is, therefore, an object of the present invention to provide method and apparatus for maintaining a dynamic logical ring in a token passing local area network.

It is also an object of this invention to provide method and apparatus for allowing the BIUs of a LAN to freely and unilaterally initiate participation in the passing of the token.

It is another object of the present invention to provide method and apparatus for re-establishing the logical ring of a LAN after a BIU has failed.

It is a still further object of the present invention to provide method and apparatus for detecting and regenerating lost tokens.

Another object of the present invention is to provide a token passing local area network wherein the token is passed between adjacent BIUs thereby providing a local area network with improved noise immunity.

Still another object of the present invention is to provide a method for establishing the logical ring such that the token is passed between physically adjacent BIUs.

BRIEF DESCRIPTION OF THE DRAWINGS

The subject matter which is regarded as invention is particularly pointed out in the claims appended hereto. The invention, however, both as to organization and method of practice, may best be understood from a reading of the following detailed description taken in conjunction with the drawings in which:

DETAILED DESCRIPTION OF THE DRAWINGS

The present invention provides improved method and apparatus for maintaining a dynamic logical ring in a token passing local area network (LAN) such as that described in IEEE Project 802 Local Network Standards, Draft C, Section 4 (1982).

Token passing local area networks are well known in the art. Exemplary of these is that described in U.S. Pat. No. 4,464,749 to Ulug, issued Aug. 7, 1984, and assigned to the assignee of the present invention, which is incorporated herein in its entirety.

Figure 1:
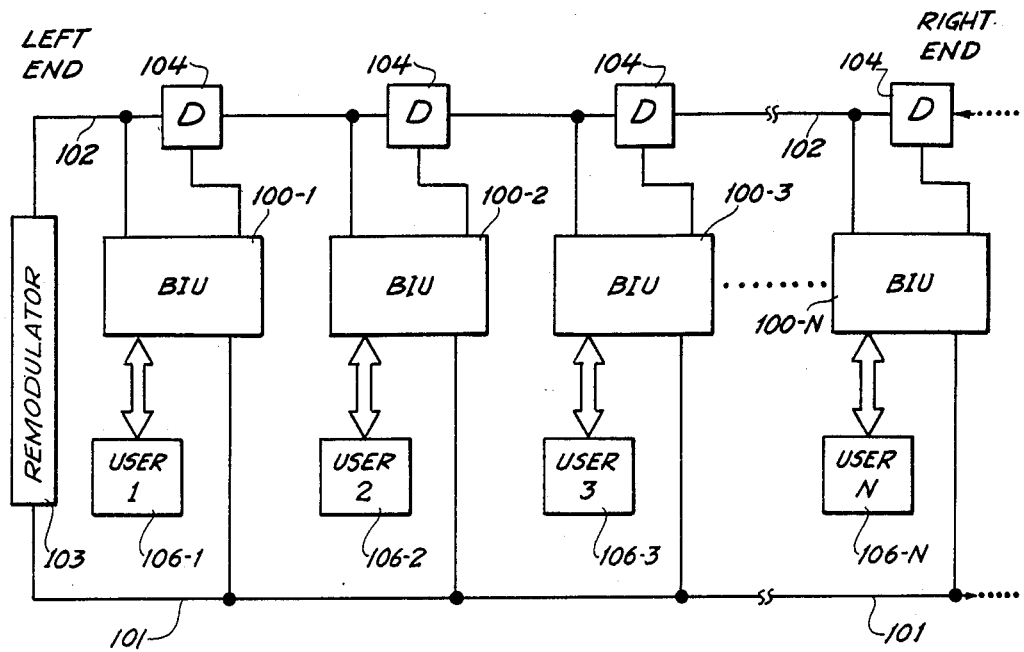
FIG. 1 is an illustrative block diagram of a local area network including the apparatus which is the subject of the present invention.

A local network capable of implementing the subject invention is shown in FIG. 1 wherein a plurality of bus interface units (BIUs) 100-1 through 100-N are each connected directly to receive bus 101 and transmission bus 102. Receive bus 101 and transmission bus 102 may each comprise any means for transferring digital information between BIUs 100. Particularly, receive bus 101 and transmission bus 102 may comprise electrical transmission means and/or fiber optic transmission means as is known in the art. Receive bus 101 and transmission bus 102 are each terminated at their right end by their characteristic impedance (not shown) for preventing reflections of transmissions as is known in the art. Should receive bus 101 and/or transmission bus 102 comprise optical transmission means, they would be terminated with an opaque material as is also known in the art. Receive bus 101 and transmission bus 102 may each comprise a CATV cable such as those readily available from the Jerrold Electronics Company.

Receive bus 101 is shown coupled to transmission bus 102 via a remodulator 103. Remodulator 103 is provided to receive information placed on transmission bus 102 and retransmit this information on receive bus 101. In local area networks where transmission bus 102 and receive bus 101 comprise the same physical cable, remodulator 103 may also comprise a frequency translator to receive information on one frequency and retransmit on another. Devices suitable for use as remodulator 103 are well known in the art. See, e.g., U.S. Pat. No. (U.S. Patent & Trademark application Ser. No. 504,716, filed June 15, 1983) to Ulug, and assigned to the assignee of the present invention, which is incorporated herein in its entirety.

Alternatively, transmit bus 102 may comprise a bidirectional bus for both transmitting and receiving information. In this embodiment bus 102 would be terminated at both ends by its characteristic impedance and, therefore, remodulator 103 and receive bus 101 are unnecessary. Local area networks which employ bidirectional buses are also known in the art, however, require BIUs different from those of FIG. 3, as will be discussed hereinbelow.

Figure 2:
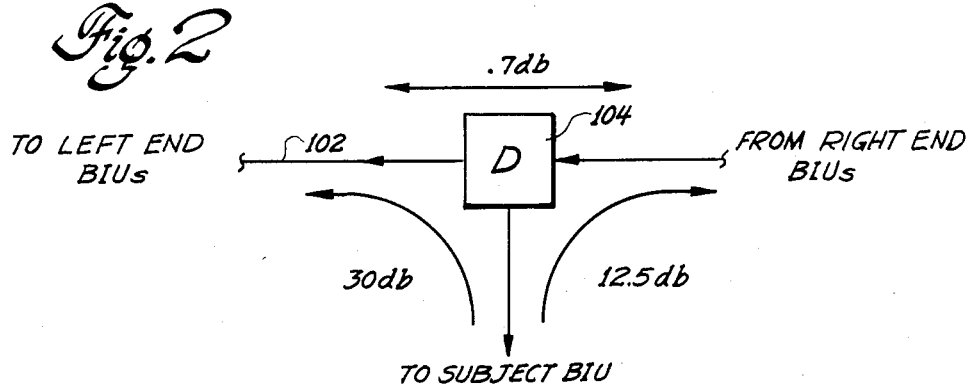
FIG. 2 is a more detailed illustrative block diagram of the directional couplers of FIG. 1.

Each BIU 100 is further coupled to transmission bus 102 via a directional coupler 104. With reference to FIG. 2, a block diagram is provided to illustrate the operation of directional coupler 104. Therein, directional coupler 104 is shown to provide an attenuation factor of approximately 0.7 decibels in the transverse direction, i.e., from BIU to BIU along transmission bus 102. This relatively low attenuation factor in the transverse direction is provided to allow any BIU along transmission bus 102 to transmit information through each directional coupler 104 to remodulator 103 and all other BIUs coupled to transmission bus 102. A relatively high reverse attenuation factor is provided between the left end port of directional coupler 104 and the BIU input port of the directional coupler (typically 30 decibels). This relatively high reverse attenuation factor is provided to prevent information placed on transmission bus 102 from being received by any right end BIU, with respect to the transmitting BIU, via directional coupler 104. A moderate forward attention factor (typically 12.5 decibels) is provided from the right end port of the directional coupler to its BIU input port. This moderate forward direction attenuation factor is provided to allow information placed on transmission bus 102 by a BIU to be received by each left end BIU, with respect to the transmitting BIU, via their respective directional couplers 104.

Directional coupler 104 may comprise any device, or plurality of devices, capable of performing the functions as described above. An exemplary one of said devices is shown and described in the afore-referenced U.S. Pat. No. (U.S.P.T.O. application Ser. No. 504,716) to Ulug. For example, directional coupler 104 may comprise a Model DC-12B tap as may be obtained from the Jerrold Electronics Company.

Referring again to FIG. 1, each BIU 100-1 through 100-N is coupled to a respective user device 106-1 through 106-N for providing a sophisticated interface between the user device and transmission bus 102. User devices 106 may comprise any of a plurality of devices normally found in local area networks, e.g., a personal processing device, a printing device, a memory device, etc. Although each user device 106 is shown as a single discrete element, it will be apparent to those skilled in the art that a plurality of user devices may be coupled to the same BIU for communication with receive bus 101 and transmission bus 102 via that BIU.

Figure 3:
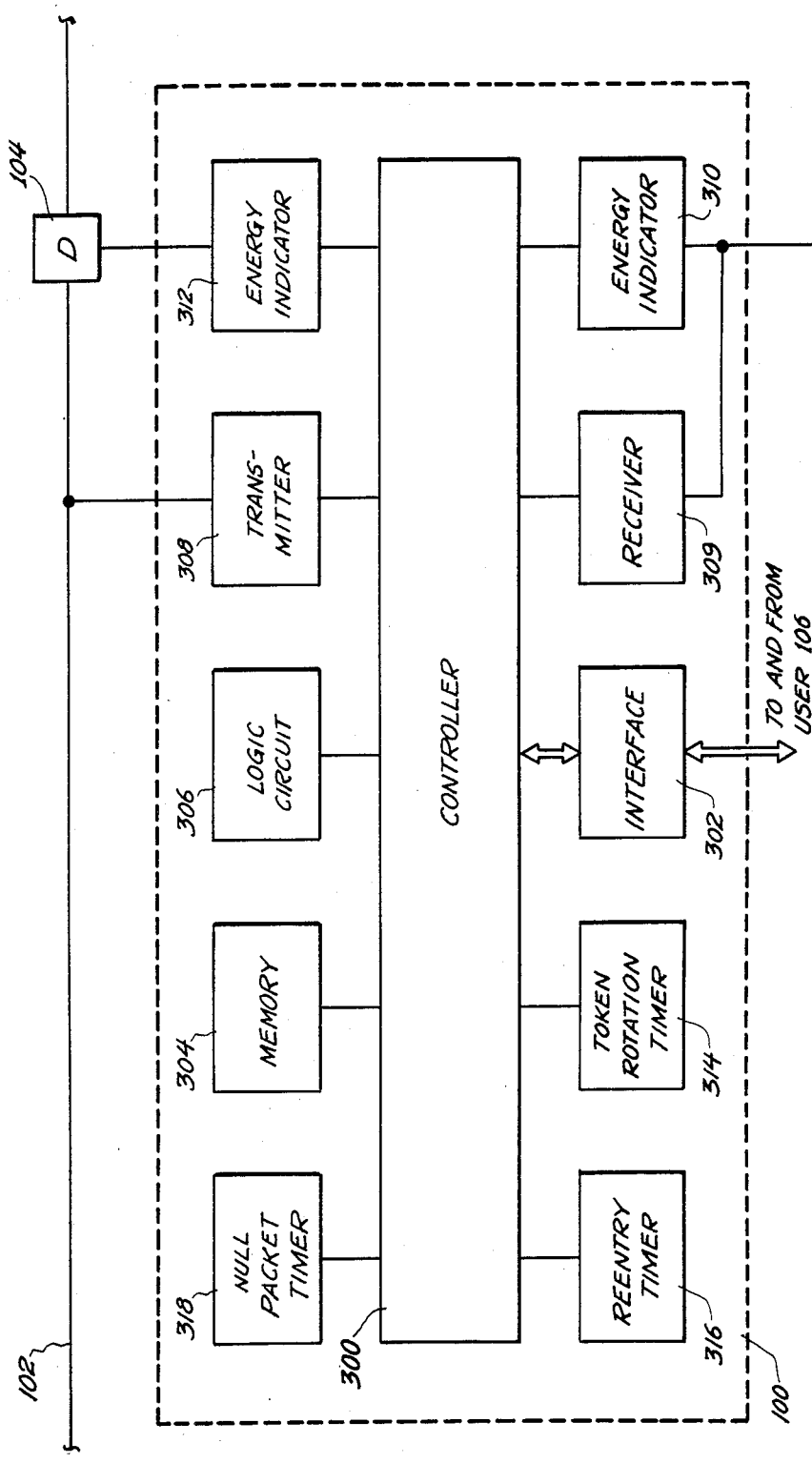
FIG. 3 is a more detailed block diagram of the BIUs of FIG. 1.

With reference to FIG. 3, there is shown a more detailed illustrative block diagram of each BIU 100. Therein, each BIU 100 is shown to comprise a controller 300 coupled to communicate to its respective user device 106 (not shown) via an interface 302.

Controller 300 may comprise any logical element, or combination of logical elements, capable of controlling the transfer of information between a user 106, transmission bus 102 and receive bus 101. In so doing, controller 300 must implement the methods described herein. As an example, controller 300 may comprise a pair of microprocessors, one for controlling the transfer of information between user 106 and BIU 100, and the other for controlling the transfer of information between BIU 100, transmission bus 102 and receive bus 101. These microprocessors may each be programmed, by methods and apparatus known in the art, to implement the methods described herein for information transfer between users 106 via transmit bus 102 and receive bus 101.

Interface 302 may comprise any device, or combination of devices, capable of adapting information from user device 106 for use in controller 300 and, conversely, adapting information from controller 300 for use in user device 106.

Controller 300 is also coupled to a memory device 304. Memory 304 may comprise read only memory (ROM) for permanently storing information, e.g., program information. Additionally and alternatively, memory 304 may comprise random access memory (RAM) for temporarily storing information, e.g., information packets to be transmitted from its respective user device 106 to transmission bus 102 and/or information packets to be transmitted to its respective user device 106 from receive bus 101.

Controller 300 is also shown coupled to a logic circuit 306. Logic circuit 306 may comprise any support circuitry necessary to adapt controller 300 for use in a token passing local area network generally, or for use in a token passing local area network such as the one described herein. For example, logic circuit 306 may comprise timers, latches, comparators, bistables and/or monostables, etc. Choice and configuration of these devices can readily be made by those skilled in the art after selecting a particular controller as described hereinabove.

Transmission bus 102 is shown coupled to controller 300 via a transmitter 308. Transmitter 308 may comprise any device, or combination of devices, capable of transmitting digital information on transmission bus 102 from controller 300.

Receive bus 101 is shown coupled to controller 300 via a receiver 309. Receiver 309 may be any device, or combination of devices, for receiving the digital transmission provided to receive bus 101 from remodulator 103.

Receive bus 101 is also shown coupled to controller 300 via an energy indicator 310. Energy indicator 310 is provided to supply controller 300 with an indication that energy has been detected on receive bus 101. Energy, as used herein, includes any energy placed on transmission bus 102 and remodulated to receive bus 101 which may be in the form of a token, an information packet, a solicit successor packet, a next node packet and/or a null packet. Energy indicator 310 provides a logical zero to controller 300 when no energy is detected on receive bus 101 and, conversely, provides a logical one to controller 300 when energy is detected on receive bus 101.

In similar manner, controller 300 is shown coupled to directional coupler 104 via an energy indicator 312. Like energy indicator 310, energy indicator 312 is provided to supply controller 300 with an indication that energy has been detected from the BIU port of directional coupler 104. Energy indicators 310 and 312 may comprise any device, or combination of devices, capable of providing the energy indications as described above.

Configured in this manner, controller 300 uses the input from energy indicators 310 and 312 to determine whether another BIU is transmitting and, if so, whether the transmission originated from the right end direction or the left end direction with respect to the subject BIU. When the input to controller 300 from energy indicator 310 is a logical one, information has been placed on receive bus 101, i.e., a BIU is transmitting. When a BIU is transmitting and the input to controller 300 from energy indicator 312 is a logical one, then this transmission originated from the right end direction with respect to the subject BIU. Conversely, when another BIU is transmitting and the input to controller 300 from energy indicator 312 is a logic zero, then this transmission originated from the subject BIU or a direction to the left of the subject BIU.

Controller 300 is also coupled to a token rotation timer 314. Timer 314 is provided to indicate whether a token has been lost by measuring the time interval occurring from the instant the subject BIU transmits the token until the token is again received. If the time interval exceeds a predetermined token rotation time, typically one or two milliseconds, the subject BIU assumes the token is lost. Timer 314 may comprise any known device or devices for measuring time intervals in the millisecond range.

The token rotation time, to be measured by timer 314, may be determined by any means known in the art. For example, the token rotation time to be used in one interval may be determined dynamically by measuring the token rotation time of the previous interval. Further, token rotation timer 314 may be adapted to indicate elapse of the token rotation time interval only when the measured time exceeds the token rotation time by a predetermined variance period. The variance period is provided to allow for fluctuations in the token rotation time during rotations when a BIU enters or exits the logical ring. If the measured interval does not exceed the previous interval by the variance period, the measured interval becomes the previous interval for the next rotation.

Controller 300 is shown coupled to re-entry timer 316. Re-entry timer 316 is provided to indicate the elapse of a predetermined re-entry time interval. The re-entry timer begins the re-entry interval at the instant the participating BIU receives a solicit successor packet which indicates that the logical ring must be re-established, i.e., a BIU is entering or a BIU has failed. During the re-entry time interval, no transmissions are permitted except those to re-establish the ring. Since the reentry time interval is typically in the microsecond range, re-entry timer 316 may comprise any device, or combination of devices, capable of measuring this time interval.

Controller 300 is also coupled to null packet timer 318. Null packet timer 318 is provided to indicate the elapse of a null packet time interval. Each BIU 100 determines whether a null packet has been received during this interval as described more fully below. The null packet time interval is typically chosen to equal the two way propagation delay of transmit bus 102. Accordingly, null packet timer 318 may comprise any device capable of measuring time intervals in the microsecond range.

Each BIU 100 comprises a plurality of devices as described herein. An exemplary one of such BIUs is shown and described in the aforementioned U.S. Pat. No. 4,464,749 to Ulug.

As mentioned above, transmit bus 102 may comprise a bidirectional bus for both transmitting and receiving information. This alternate embodiment eliminates the need for receive bus 101 and remodulator 103, yet requires slight modifications to BIU 100. Particularly, receiver 309 and energy indicator 310 need be connected directly to transmit bus 102 for receiving information and energy therefrom. Alternatively, transmitter 308 and receiver 309 may comprise a single device known as a transceiver in the art. As an example, see Computrol's model 30-0078 asynchronous coaxial cable modem.

As mentioned hereinabove, the subject invention improves the efficiency of a dynamic logical ring in a token passing local area network. In a local area network wherein the logical ring is dynamically altered, i.e., BIUs are free to enter the logical ring, delays are incurred each time a BIU enters the ring. This is because each time a BIU enters the logical ring, the logical ring must be re-established such that each BIU participating in the passing of the token knows its predecessor BIU, to wit, that BIU from which it receives the token, and such that each participating BIU knows its successor BIU, to wit, that BIU to which it is to transfer the token.

Because prior art logical rings are maintained in order of descending BIU address, entering BIUs cannot simply be added to the end of the logical ring but must instead be added to the logical ring in a predetermined order. Such logical rings require complex protocols for re-establishing the logical ring thereby incurring delays each time a BIU enters the ring.

Also, prior art local area network protocols, and particularly that of the afore-referenced IEEE 802 Local Network Standards, require a BIU wishing to enter the logical ring to wait until it is solicited by a BIU already participating in the ring. Thus, delays are not only incurred in re-establishing the ring but a BIU wishing to enter the ring incurs delay waiting to be solicited by a participating BIU. Further, because a BIU wishing to enter the ring can only be solicited by a particular one of the participating BIUs, additional delays are incurred until that particular BIU solicits entrants to the ring.

The present invention overcomes these and other inefficiencies of the prior art by providing a less complicated protocol for maintaining a dynamic logical ring in a token passing local area network. In accordance with the method of the present invention, the token is passed between adjacent participating BIUs from the right end of bus 102 to the left end thereof. When the token reaches the participating BIU coupled proximate the left end, it is passed to the BIU coupled proximate the right end and again traverses the bus from right to left between adjacent participating BIUs. A BIU wishing to enter the logical ring may unilaterally initiate participation, without being solicited or receiving the token, by monitoring the transmission bus until the bus is determined idle and, thereafter, transmitting a solicit successor (SS) packet.

A solicit successor packet, or signal, as used herein, refers to a packet which solicits a response from a predetermined group of BIUs. In the present invention, solicit successor packets are used to solicit a response from each BIU which is physically coupled to transmission bus 102 in the direction of the left end with respect to the transmitting BIU.

Figure 4:
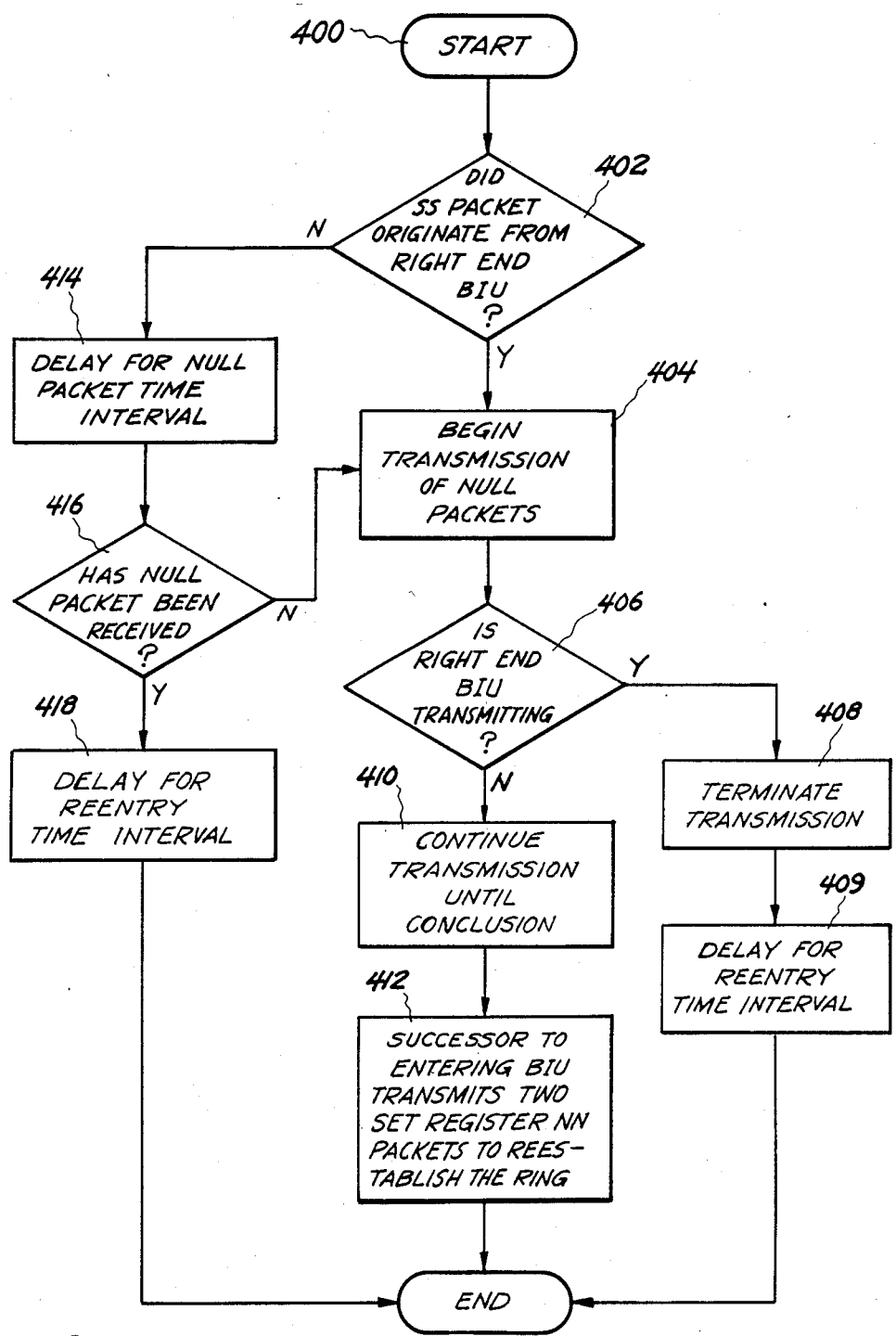
FIG. 4 is a decisional flow diagram illustrating the method by which the participating BIUs determine which is to be the successor to an entering BIU.

After a BIU has thus indicated its desire to enter the logical ring, the participating BIUs cooperate to determine which will be the successor to the entering BIU. The method by which the participating BIUs determine which is to be the successor to the entering BIU may best be described by reference to the decisional flow diagram of FIG. 4. The method illustrated therein is initiated in step 400 wherein a BIU wishing to enter the logical ring transmits a solicit successor packet as described above. Each participating BIU thereafter determines whether the solicit successor packet originated from the right end direction, step 402, as described hereinabove with reference to the energy indicators of FIG. 3. Each participating BIU coupled to bus 102 to the left of the entering BIU, i.e., those for which the solicit successor packet originated from a right end BIU, begins transmission of a null packet, step 404.

A null packet, or signal, as used herein, refers to a packet which is addressed to the BIU from which it was transmitted, i.e., a packet with identical source and destination addresses. The data section of the null packet contains the address of the BIU entering the ring. This is necessary in case the successor to the entering BIU fails before the ring is re-established.

Contemporaneous with the initiation of transmission of the null packet, each left end BIU monitors the transmission bus to determine whether another BIU is initiating transmission from the right end with respect to the monitoring BIU, step 406. Because each transmission is preceeded by a sequence of meaningless data, known in the art as the preamble, and because energy can be detected on transmission bus 102 immediately after being placed thereon, the determination of step 406 can be made before any BIU begins transmission of meaningful data. If a BIU is initiating transmission of a null packet from the right end with respect to the subject BIU, the subject BIU will terminate its transmission, step 408, and will not attempt to transmit for a reentry time interval, step 409. If, however, no BIU is attempting to transmit from the right end direction with respect to the subject BIU, then the subject BIU will continue its transmission until the conclusion thereof, step 410.

It will be appreciated by those skilled in the art that in accordance with the method described above, only one BIU will be successful in transmitting its null packet, to wit, that BIU which is transmitting from the right of all other transmitting BIUs. In the method described above, the successful BIU will be coupled to the bus physically proximate the entering BIU in the direction of the left end. This BIU will receive its null packet from receive bus 101, as described hereinabove with reference to FIGS. 1-3, and will thereby be able to identify itself as the successor BIU to the entering BIU.

The identified successor will then transmit two set register next node (NN) signals, or packets, to re-establish the logical ring, step 412. One next node packet is addressed to the transmitting BIU's former predecessor to inform the former predecessor that the entering BIU is its new successor. The other next node packet is addressed to the entering BIU to inform the entering BIU of the identity of its successor and predecessor. In this manner, the logical ring is re-established such that the token is passed from former predecessor to entering BIU to the identified successor.

In the event that the entering BIU is coupled to bus 102 to the left of each participating BIU, e.g., the entering BIU is BIU 100-1 of FIG. 1, then the method as described above will not identify a successor to the entering BIU and, therefore, alternate methodology need be employed. In this case, the participating BIUs cooperate to identify the successor to the entering BIU by determining which participating BIU is coupled to the bus proximate the right end. Such alternative methodology is implemented via step 402 wherein each BIU which determines that the solicit successor packet did not originate from a right end BIU delays for a null packet time interval, step 414.

The null packet time interval is a predetermined time interval during which a null packet should be received. The null packet time interval is measured by null packet timer 318 as described above with reference to FIG. 3. After this time interval has elapsed, each right end BIU determines whether a null packet has been received, step 416, and if not, begins transmission of a null packet, step 404, to determine the successor to the entering BIU as described hereinabove.

Therefore, in the case where no null packet is received during the null packet time interval, indicating that the entering BIU is coupled to bus 102 to the left of each participating BIU, the successor to the entrant will be identified as the participating BIU coupled to the transmission bus to the right of all other participating BIUs, i.e., proximate the right end.

In the event a null packet has been received, step 416, each right end BIU will delay for a re-entry time interval, step 418. The re-entry time interval is chosen to allow the recipient of the null packet to transmit the two set register NN packets without interruption. In addition to the re-entry time interval, a communication period may be allotted to allow other BIUs to enter the ring. For example, if two non-participating BIUs attempt to enter the ring simultaneously by transmitting SS packets, the right end most BIU will be successful and will be entered as described above. The other BIU will then transmit its SS packet during the communication period.

Using the above described protocol, a BIU can freely and unilaterally decide to enter the logical ring to participate in the LAN without incurring unworkable delays for reestablishing the logical ring. In like manner, a BIU wishing to exit the network may freely and unilaterally decide to do so, also without incurring unworkable delays for re-establishing the logical ring. This is done by transmitting two set register NN packets, one to its predecessor and one to its successor.

In some instances, however, a BIU fails and, therefore, is unable to transmit NN packets or the token. In these instances the participating BIUs must re-establish the ring. Also, when the local area network is located in a high noise environment, the token may be lost, i.e., never received, or the token may be altered such that the receiving BIU does not recognize the received packet as a token. In these instances, the participating BIUs must again re-establish the ring.

Figure 5:
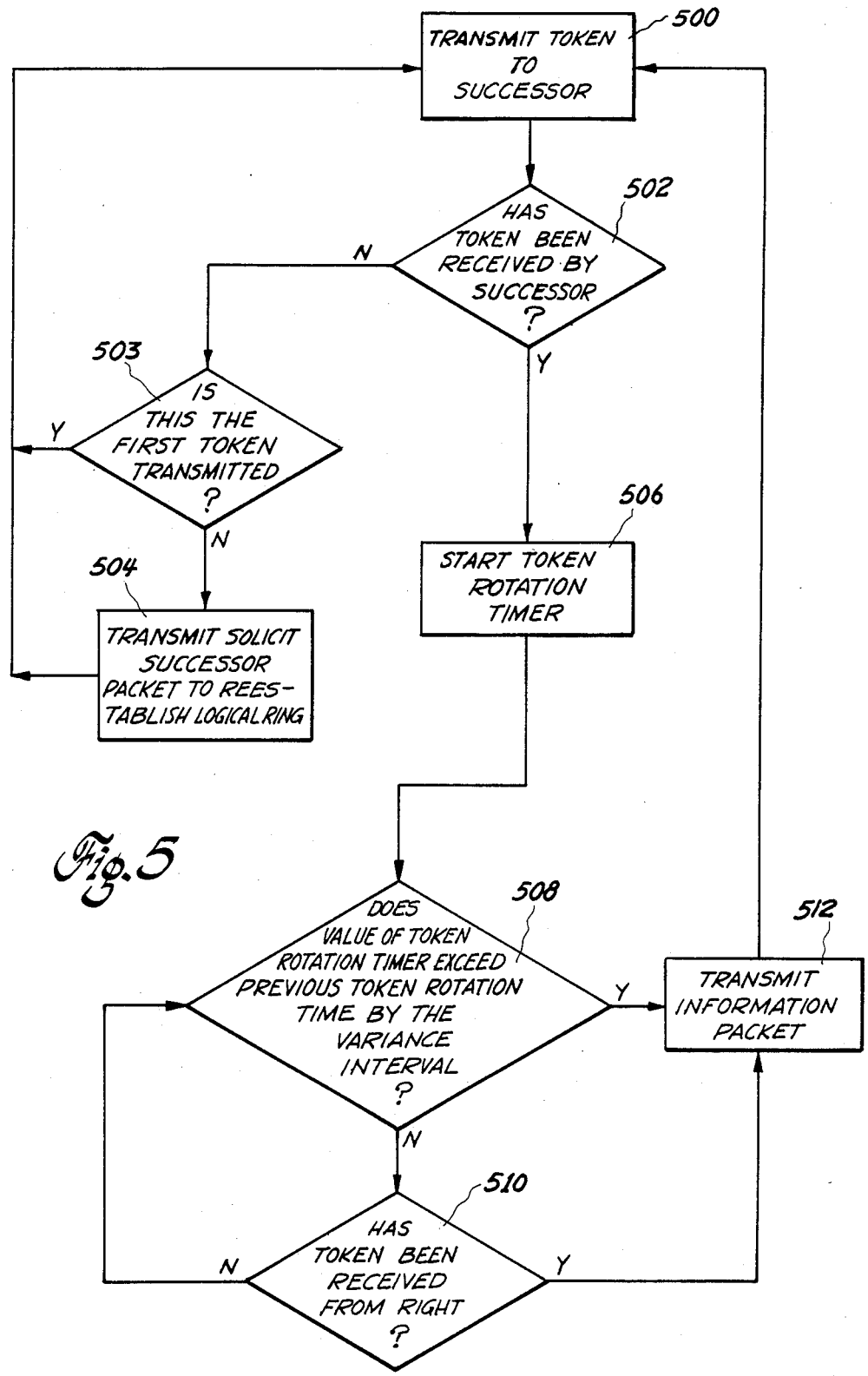
FIG. 5 is a decisional flow diagram illustrating the method by which the participating BIUs maintain the logical ring after a BIU has failed or a token has been lost.

The method by which the logical ring may be reestablished after a BIU has failed or the token has been destroyed may best be described by reference to the illustrative block diagram of FIG. 5. Therein, a BIU which transmits the token to its successor, step 500, determines whether the token has been received by its successor, step 502. This is accomplished by monitoring the bus for a turnaround time interval to determine whether the successor has transmitted a packet. The turnaround time interval is the period of time necessary for a BIU to process a token and either transmit the token or an information packet. This interval can be readily determined by one skilled in the art. If the token has not been received, the transmitting BIU will determine whether the transmitted token was the first token transmitted, step 503. If so, the transmitting BIU will assume the token was not recognized by his successor and retransmit the token, step 500. If, however, the transmitted token was the second token transmitted, the transmitting BIU will assume its successor has failed and transmit a solicit successor SS packet to re-establish the logical ring, step 504.

This solicit successor SS packet may be treated in the same manner as described above, i.e., as though the transmitting BIU were entering the logical ring, to identify the successor to the soliciting BIU. The BIU identified thereby then transmits only one set register NN packet to the transmitting BIU thereby re-establishing the logical ring. In this embodiment, solicit successor packets may carry information which inform the receiving BIUs whether the transmitting BIU is already participating in the logical ring or, conversely, whether the transmitting BIU wishes to enter the logical ring.

It is noted that with the method described above, two or more successive BIUs may fail contemporaneously without affecting the manner, method or time interval for re-establishing the ring.

If the token transmitting BIU determines that the token has been received by its successor, step 502, it then starts token rotation timer 314 (FIG. 3) step 506. As mentioned above, token rotation timer 314 measures the time interval necessary for the token to completely traverse the logical ring and return to the subject BIU.

After starting the token rotation timer, step 506, the BIU then determines whether the token rotation time has expired, step 508, by determining whether the value of the token rotation timer exceeds the token rotation time by the variance period as described above with reference to token rotation timer 314 (FIG. 3). If the token rotation time has not expired, the BIU then determines whether the token has been received from the right, or in the case of the BIU coupled proximate the right end whether the token has been received from the BIU coupled proximate the left end, step 510. The BIU continually checks whether the token rotation timer has expired or the token has been received until either of these two conditions is determined to be true, at which time the BIU will transmit its information packet, step 512, and then transmit the token to its successor, step 500.

It will be noted that should the token rotation time expire before a token has been received, the BIU assumes the token has been lost and, therefore, transmits an information packet and generates a new token. If, however, the token has been received, the BIU transmits an information packet in the normal manner and generates a token to transmit to its successor. In either case a token must be generated each time it is transmitted, as is known in the art. Information necessary for generation of a token may be permanently recorded in ROM memory 304, FIG. 3.

Using this method for regenerating destroyed tokens, it is possible that more than one token may be traversing the ring simultaneously. To avoid this, each BIU processing a token monitors the bus to determine whether another token exists. When a second token is detected the subject BIU destroys its token, i.e., does not generate and transmit a token.

In accordance with methods described hereinabove, the token must be passed between adjacent BIUs from the right end of bus 102 to the left end thereof. Therefore, the logical ring must be established in this order whenever the network is initialized. To this end, when power is applied to the network, each BIU delays for a short time interval to insure synchronous operation and, thereafter, the BIUs wishing to participate in the network cooperate to ascertain the order in which they are physically coupled to the bus and, thereby, establish the order of the logical ring. This is done by continuously transmitting null packets and learning the order in which the packets are successful. Transmission of null packets is in accordance with the method of FIG. 4 such that the BIU transmitting from the right of all other transmitting BIUs will be successful. After a BIU successfully transmits its null packet, it no longer attempts to transmit another, but continues to monitor the bus for the next successful null packet and identifies the transmitter thereof as its successor. In similar manner, the BIU will remember which BIU transmitted successfully immediately prior to its own successful transmission and will identify the prior transmitter as its predecessor. Additionally, each BIU will record the address of the first successful transmitter, to wit, the BIU coupled proximate the right end, and each BIU will record the address of the last successful transmitter, to wit, the BIU coupled proximate the left end. In this manner the logical ring will be established in accordance with the order in which the BIUs are physically coupled to transmission bus 102 starting from the right end thereof and ending with the left end thereof, with the left end most BIU transmitting the token to the right end most BIU.

It will be noted that with the methods described hereinabove it is possible for a BIU to transmit without first receiving the token and, therefore, it is necessary in each of the methods described herein for a BIU to first monitor the transmission bus before transmitting to avoid collisions. This may be accomplished via energy indicator 310 (FIG. 3) or any other method known in the art.

While only several presently preferred embodiments of my novel method and apparatus for maintaining a dynamic logical ring in a token passing local area network have been presented in detail herein, many modifications and variations will now become apparent to those skilled in the art. It is my intent, therefore, to be limited only by the scope of the appended claims and not by the specific details presented herein.

What is claimed is:

1. In a token passing local area network (LAN) wherein a plurality of participating bus interface units (BIUs) transmit a token from a predecessor participating BIU to a successor participating BIU via a common transmission bus, a method for maintaining a dynamic logical ring such that a nonparticipating BIU wishing to enter said logical ring to participate in the passing of said token can initiate entrance thereto, said method comprising the steps of:
   (a) said nonparticipating BIU transmitting a solicit successor signal to initiate entrance to said logical ring;
   (b) responsive to said solicit successor signal, said participating BIUs cooperating to determine which one of said participating BIUs will be the successor to said entering BIU;
   (c) said determined successor determining which one of said participating BIUs will be the predecessor to said entering BIU; and
   (d) re-establishing said logical ring such that said token will be passed from said determined predecessor to said entering BIU and then to said determined successor thereby allowing said entering BIU to participate in the passing of said token.

2. The method as recited in claim 1 wherein said transmission bus includes first and second ends and wherein said step of determining which of said participating BIUs will be the successor to said entering BIU comprises the substeps of:
   determining whether any of said participating BIUs are second end participating BIUs, or whether each of said participating BIUs is a first end participating BIU, said second end participating BIUs being those coupled to said bus in the direction of said second end with respect to said entering BIU and, said first end participating BIUs being those coupled to said bus in the direction of said first end with respect to said entering BIU;
   if any of said participating BIUs are second end participating BIUs, then determining which one of said second end participating BIUs is coupled to said bus physically proximate said entering BIU, said physically proximate BIU being said determined successor; and
   if each said participating BIU is a first end participating BIU, then determining which of said first end participating BIUs is the first end most, said first end most participating BIU being coupled to the bus proximate said first end and, said first end most participating BIU further being identified as said determined successor.

3. The method as recited in claim 2 wherein the step of determining whether any of said participating BIUs are second end participating BIUs comprises the step of each said participating BIU determining whether said solicit successor signal originated from said first end direction, those of said participating BIUs for which said solicit successor signal originated from said first end direction being second end participating BIUs and those of said participating BIUs for which said solicit successor signal did not originate from said first end direction being first end paticipating BIUs.

4. The method as recited in claim 2 wherein said step of determining which one of said second end participating BIUs is coupled to the bus physically proximate said entering BIU comprises the steps of:
   each said second end participating BIU attempting to transmit a null signal; and
   each said second end participating BIU monitoring said transmission bus to determine whether another said participating BIU is transmitting a null signal from the direction of said first end and, if so, discontinuing its transmission such that said second end BIU which receives its null signal is identified as said second end participating BIU coupled to the bus physically proximate said entering BIU.

5. The method as recited in claim 4 wherein said step of determining whether each said participating BIU is a first end participating BIU comprises the step of each said first end participating BIU monitoring said bus for a predetermined null signal time interval to determine whether a null signal has been successfully transmitted, absence of a successful null signal indicating that each said participating BIU is coupled to said bus in the direction of said first end with respect to said entering BIU.

6. The method as recited in claim 2 wherein said step of determining which is said first end most participating BIU comprises the substeps of:
   each said first end participating BIU attempting to transmit a null signal; and
   each said first end participating BIU monitoring said transmission bus to determine whether another said participating BIU is transmitting a null signal from the direction of said first end and, if so, discontinuing its transmission such that said first end participating BIU which receives its null signal is identified as said first end most participating BIU.

7. The method as recited in claim 1 wherein the step of determining which one of said participating BIUs will be the predecessor to said entering BIU comprises the step of said determined successor identifying its former predecessor as said determined predecessor to said entering BIU.

8. The method as recited in claim 7 wherein said step of re-establishing said logical ring comprises the substeps of said determined successor;
   transmitting a next node signal to said entering BIU to inform said entering BIU of the identity of its successor and predecessor; and
   transmitting a next node signal to the former predecessor of said determined successor BIU to inform said former predecessor that said entering BIU is its new successor.

9. In a token passing local area network (LAN) wherein a plurality of participating bus interface units (BIUs) transmit a token from a predecessor BIU to a successor BIU via a common transmission bus, and wherein said transmission bus has first and second ends, a method for maintaining a dynamic logical ring such that said logical ring can be re-established after one of said participating BIUs has failed, said method comprising the steps of:
   (a) transmitting said token from said predecessor BIU to said successor BIU;
   (b) determining whether said successor BIU has successfully received said token and, if not, assuming said successor BIU has failed and is non-participating;
   (c) if said successor BIU is non-participating, determining whether any of said participating BIUs are second end participating BIUs or whether each said participating BIU is a first end participating BIU, said second end participating BIUs being those of said participating BIUs coupled to said bus in the direction of said second end with respect to said predecessor BIU and said first end participating BIUs being those of said participating BIUs coupled to said bus in the direction of said first end with respect to said predecessor BIU;
   (d) if said successor BIU is non-participating and at least one of said participating BIUs is a second end participating BIU, then determining which of said second end participating BIUs is coupled to said bus physically proximate said predecessor BIU, said physically proximate BIU being the new successor to said predecessor BIU;
   (e) if said successor BIU is nonparticipating and each said participating BIU is a first end participating BIU, then determining which one of said first end participating BIUs is the first end most, said first end most participating BIU being coupled to said bus proximate said first end and being identified as the new successor to said predecessor BIU; and
   (f) re-establishing said logical ring such that said token is passed from said predecessor BIU to said new successor.

10. The method as recited in claim 9 wherein the step of determining whether said successor BIU has successfully received said token comprises the step of monitoring said bus for a predetermined turnaround time interval to determine whether said successor BIU is transmitting, said turnaround interval being the time necessary for said successor BIU to process said token and either initiate transmission of an information packet or retransmit said token.

11. The method as recited in claim 9 wherein the step of determining whether any of said participating BIUs are second end participating BIUs comprises the substeps of:
   said predecessor BIU transmitting a solicit successor signal after determining that said successor BIU is non-participating; and
   each said participating BIU determining whether said solicit successor signal originated from said first end direction, those of said participating BIUs for which said solicit successor signal originated from said first end direction being second end participating BIUs and, those of said participating BIUs for which said solicit successor signal did not originate from said first end direction being first end participating BIUs.

12. The method as recited in claim 9 wherein said step of determining which of said second end participating BIUs is coupled proximate said predecessor comprises the substeps of:
   each said second end participating BIU attempting to transmit a null signal; and
   each said second end participating BIU monitoring said transmission bus to determine whether another said participating BIU is transmitting a null signal from the direction of said first end and, if so, discontinuing its transmission such that said second end BIU which receives its null signal is identified as said second end participating BIU coupled to said bus physically proximate said predecessor.

13. The method as recited in claim 12 wherein said step of determining whether each said participating BIU is a first end participating BIU comprises the step of each said first end participating BIU monitoring said bus for a predetermined null signal time interval to determine whether a null signal has been successfully transmitted, absent of a successful null signal indicating that each said participating BIU is coupled to said bus in the direction of said first end with respect to said entering BIU.

14. The method as recited in claim 9 wherein said step of each said first end participating BIU determining which is said first end most participating BIU comprises the substeps of:
  each said first end participating BIU attempting to transmit a null signal; and
  each said first end participating BIU monitoring said transmission bus to determine whether another said participating BIU is transmitting a null signal from the direction of said first end and, if so, discontinuing its transmission such that said first end BIU which receives its null signal is identified as said first end most participating BIU.

15. The method as recited in claim 9 wherein the step of re-establishing said logical ring comprises the substep of said new successor BIU transmitting a next node signal to said predecessor BIU to inform said predecessor BIU to begin transmitting said token to said new successor.

16. In a token passing local area network wherein a plurality of bus interface units (BIUs) transmit a token via a common transmission bus, a method for detecting the occurrence of a lost token and generating a new token upon that occurrence, said method comprising the steps of:
  (a) each said BIU determining the value of a token rotation time interval, said token rotation time interval being the time necessary for said token to traverse said bus;
  (b) each said BIU transmitting said token after receiving said token;
  (c) simultaneously with transmitting said token, each said BIU initiating a token rotation timer, said token rotation timer being adapted to indicate the elapse of said token rotation time interval;
  (d) each said BIU determining whether said token has been received before said token rotation time interval has elapsed and, if so, re-determining said token rotation time interval, transmitting a new token and, thereafter, performing step (c); and
  (e) each said BIU determining whether said first time interval has elapsed before said token is received and, if so, transmitting a new token and performing step (c).

17. In a token passing local area network wherein a plurality of participating bus interface units (BIUs) are coupled to a common transmission bus for intercommunication therebetween, and wherein said bus has first and second ends, a method of establishing a logical ring for determining the order in which a token is passed between said BIUs, said method comprising the steps of:
  (a) said participating BIUs each transmitting a signal and receiving the signals transmitted by other ones of said participating BIUs from the direction of said first bus end to ascertain therefrom the order in which said participating BIUs are physically coupled to said bus from said first end to said second end; and
  (b) establishing said ring such that said token is passed from said first end to said second end between physically adjacent participating BIUs and such that the participating BIU coupled proximate said second end passes said token to the participating BIU coupled proximate said first end.

18. The method as recited in claim 17 wherein the step of ascertaining the order in which said participating BIUs are physically coupled to said bus comprises the substeps of:
  each non-successful participating BIU attempting to transmit a null signal, said non-successful participating BIUs being those of said participating BIUs which have not successfully transmitted a null signal; and
  each said non-successful participating BIU monitoring said bus to determine whether another of said participating BIUs is transmitting from the direction of said first end and, if so, discontinuing its transmission such that the one of said non-successful participating BIUs coupled proximate said first end successfully transmits its null signal and further such that said participating BIUs ascertaining the physical order in which they are coupled to said bus.

19. The method of claim 18 further including the step of said participating BIUs recording:
  the one of said participating BIUs which first successfully transmits a null signal;
  the one of said participating BIUs which last successfully transmits a null signal;
  the one of said participating BIUs which successfully transmits a null signal immediately prior to the subject BIUs successful transmission; and
  the one of said participating BIUs which successfully transmits a null signal immediately after the subject BIUs successful transmission.

20. A bus interface unit (BIU) for interfacing the users of a local area network to a common transmission bus and for maintaining a dynamic logical ring, wherein said common transmission bus has first and second ends, said BIU being responsive to a solicit successor signal to cooperate with other BIUs coupled to said bus to re-establish said ring, said BIU comprising:
  (a) means for transmitting and receiving message signals to and from said common transmission bus;
  (b) first means for indicating when any said other BIU of said network is transmitting;
  (c) second means for indicating when any said other BIU coupled to said transmission bus in the direction of said first end with respect to the subject BIU is transmitting; and
  (d) control means responsive to said first and second indicating means for determining whether said solicit successor signal originated from said first end direction with respect to the subject BIU and, if so, attempting to transmit a null signal, said control means being further adapted to determine whether any of said other BIUs is attempting to transmit a null signal from said first end direction and, if so, terminating its own transmission thereof.

21. Apparatus as recited in claim 20 further including a null signal timer for measuring a predetermined null signal time interval, said control means being further responsive to said solicit successor signal, if said solicit successor signal originated from said second end direction of said bus with respect to said BIU, for determining whether a null signal has been successfully transmitted during said null signal time interval and, if not, attempting to transmit a null signal.

22. Apparatus as recited in claim 21 wherein said control means is further adapted to determine whether it has transmitted the received null signal and, if so, identify itself as the successor to the transmitter of said solicit successor signal and thereafter transmit a set register signal to re-establish the ring.

23. Apparatus as recited in claim 20 further including a token rotation timer for measuring a token rotation time interval, said control means being further adapted to determine said token rotation time interval and, after transmitting said token, to initiate said token rotation timer such that said control means can determine whether said token is received during said token rotation time interval and, if not, said control means being adapted to transmit a new token.

* * * * *